Figure 1:
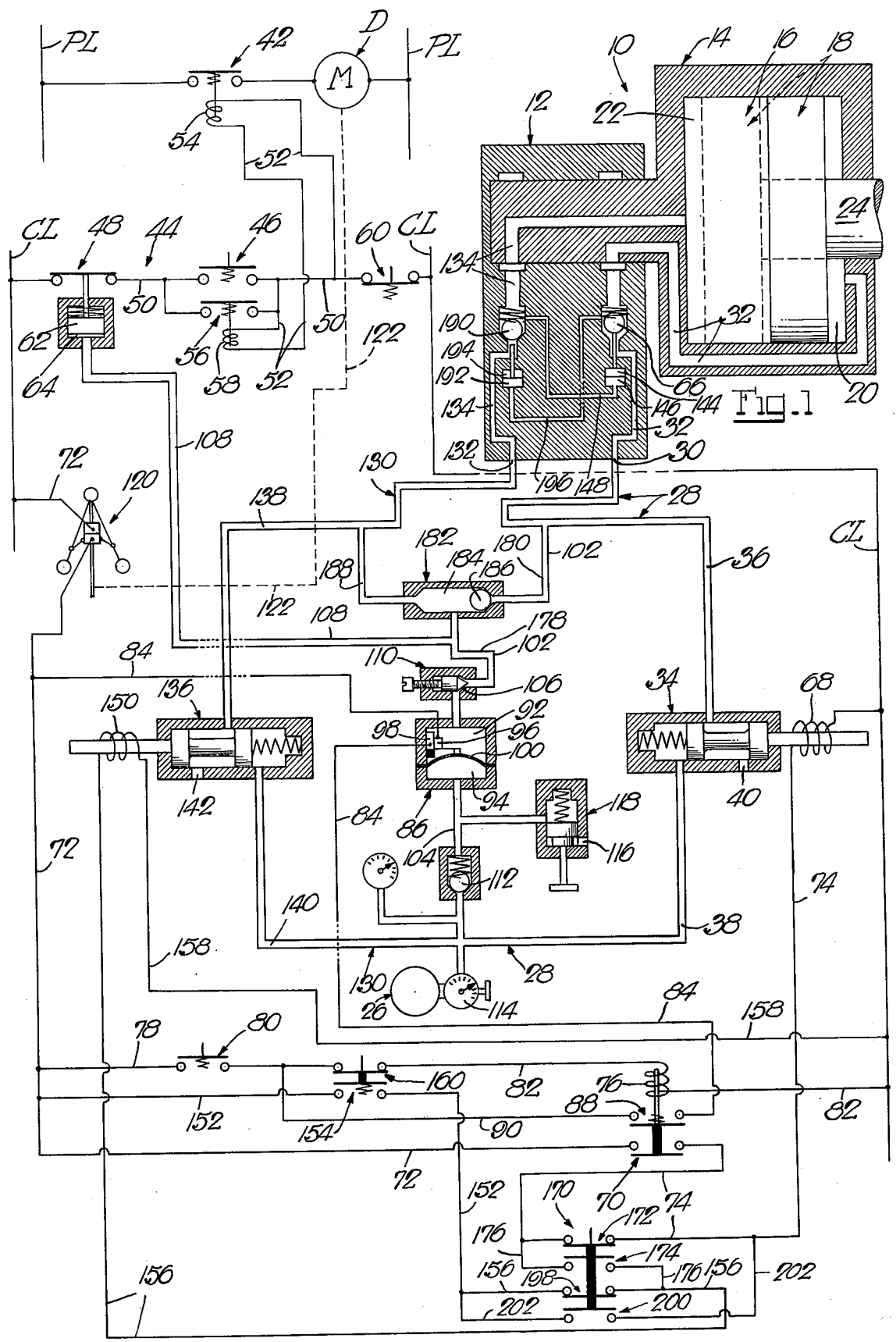

United States Patent [19]
Selden

[11] 3,908,383
[45] Sept. 30, 1975

[54] ROTARY CHUCK INSTALLATION OF FLUID-ACTUATED TYPE

[75] Inventor: Boynton Selden, West Hartford, Conn.

[73] Assignee: Cushman Industries, Incorporated, Hartford, Conn.

[22] Filed: Sept. 24, 1974

[21] Appl. No.: 508,877

[52] U.S. Cl. .......................... 60/698; 279/4; 91/420
[51] Int. Cl.² .................... B23B 5/22; B23B 31/30; F01B 21/04
[58] Field of Search ................. 91/61, 420; 92/106; 60/406, 706, 709, 698, 718, 720; 279/4

[56] References Cited
UNITED STATES PATENTS
| | | | |
|---|---|---|---|
| 2,627,168 | 2/1953 | Stevens | 60/706 |
| 2,660,028 | 11/1953 | Geyer | 60/709 |
| 3,664,470 | 5/1972 | Beech | 91/61 X |

*Primary Examiner*—Martin P. Schwadron
*Assistant Examiner*—Allen M. Ostrager
*Attorney, Agent, or Firm*—Walter Spruegel

[57] ABSTRACT

A rotary chuck installation including a chuck power drive with a manual drive control operative on manipulation to start the drive, and a swivel coupling having in the rotary member thereof a cylinder with a piston defining in the cylinder a chuck-closing end and being shiftable in chuck-closing position on admission of operating fluid from a fluid pressure supply source to this cylinder end on manipulation of a chucking control, with the installation featuring provisions whereby the drive control is functionally unresponsive to manipulation until on manipulation of the chucking control the operating fluid admitted to the cylinder end has shifted the piston to its chuck-closing position and also subjects the same in the latter position to the full supply pressure of the operating fluid.

14 Claims, 1 Drawing Figure

ROTARY CHUCK INSTALLATION OF FLUID-ACTUATED TYPE

This invention relates to rotary chucks in general, and to rotary chuck installations of fluid-actuated type in particular.

Chuck installations of this type provide the usual power drive with start and stop controls. To open and close the chucks, recourse is customarily had to a swivel coupling of which a rotary member turns with the associated chuck and provides a cylinder with a piston which is operatively connected with a jaw actuator of the chuck to close and open the latter on admission of operating fluid under a usually set supply pressure to the opposite chuck-closing and chuck-opening ends, respectively, of the cylinder, and the other, fixed companion member of the coupling has two ports which through passages in both coupling members communicate with the opposite cylinder ends, with these ports being also connected with conduits through which to pass operating fluid to and from the respective cylinder ends on actuation of suitable valve mechanism with customary manual chucking and unchucking controls. These controls are usually provided within ready reach and view of the chuck operator for his manipulation of the same as required for efficient chuck operation.

While these controls are entirely satisfactory in most respects, they are seriously deficient in at least one important respect, in that they lend themselves to manipulation by a chuck operator for starting the power drive of the chuck before the chuck jaws exert their full operational grip on work to be operated on, with the ensuing likelihood of damage to the work or operating tool or even potentially hazardous throw-off of the work from the spinning chuck. Thus, while on the operator's manipulation of the chucking control operating fluid under pressure is immediately admitted into the chuck-closing end of the cylinder in the swivel coupling, it does take some time interval, usually rather short but inevitable, before the piston in the cylinder reaches chuck-closing position and also becomes subjected to the full supply pressure of the operating fluid, and if the operator should manipulate the drive start control before the end of this time interval, as he may well do on occasion, the changes of damage to the work or operating tool or even throw-off of the work from the spinning chuck become very real. This intolerable condition in chuck operation is all the more likely to arise in more modern chuck installations in which the fluid passages to the cylinder in the swivel coupling are kept rather narrow to permit chuck operation with an installed fluid pressure supply source of economical small size and capacity.

It is the primary object of the present invention to attain in a chuck installation of this type total elimination of the aforementioned intolerable condition, by providing for the valve mechanism and power drive a manual chucking control and a drive start control, respectively, of which the drive start control is functionally unresponsive to an operator's manipulation during inflow of operating fluid under pressure into the chuck-closing end of the cylinder in the swivel coupling pursuant to the operator's manipulation of the chucking control, and is functionally responsive to the operator's manipulation only after the piston in the cylinder has reached chuck-closing position and in the latter position is also subjected to the full supply pressure of the operating fluid in the chuck-closing cylinder end.

It is another object of the present invention to arrange in a chuck installation of this type the aforementioned manual controls so that the drive start control is, on manipulation of the chucking control, subjected to the pressure of the operating fluid then admitted to the chuck-closing cylinder end for a time interval which is preset to be at least equal to the time interval during which the admitted fluid in the chuck-closing cylinder and displaces the piston to its chuck-closing position and also subjects the same in the latter position to the full supply pressure of the operating fluid, with the drive start control being no longer subjected to fluid pressure at the end of the preset time interval, and being functionally unresponsive and responsive to an operator's manipulation when subjected and non-subjected to fluid pressure, respectively.

It is a further object of the present invention to provide a chuck installation of this type in which the valve mechanism includes a main valve and a check valve, of which the main valve is interposed in the conduit that provides a fluid passage between a fluid pressure supply source and the port in the swivel coupling which is in communication with the chuck-closing cylinder end, and the check valve is interposed in the fluid passage between the main valve and the chuck-closing cylinder end, and is normally closed to trap operating fluid in the latter, with the main valve being normally urged into an inoperative position in which to vent the fluid passage between these valves, and shiftable into an operative position in which to pass operating fluid from the supply source to the check valve and, hence, to the chuck-closing cylinder end, and the drive start control being subjected to the pressure of operating fluid in the passage between the main and check valves. The manual chucking control is adapted to this valve arrangement in that the control is arranged to respond to the operator's manipulation in shifting the main valve to its operative position and holding it in that position to the end of the aforementioned preset time interval, after which the main valve is returned to its inoperative position. Thus, on manipulation of the chucking control by the operator, operating fluid under pressure from the supply source is free to pass through the main and check valves into the chuck-closing cylinder end for the preset time interval during which the manual drive start control is also subjected to the pressure of this fluid and, hence, is functionally unresponsive to manipulation, with the piston in the cylinder having been shifted to its chuck-closing position and being in that position also subjected to the full supply pressure of the operating fluid at the expiration of the preset time interval. However, with the return of the main valve to its inoperative position at the expiration of this preset time interval, the fluid passage between the main and check valves is vented, with the check valve being then closed to lock the operating fluid in the chuck-closing cylinder end, and the manual drive start control being then no longer subjected to fluid pressure and, hence, being functionally responsive to the operator's manipulation to start the chuck drive.

Another object of the present invention is to provide a chuck installation of this type in which the manual chucking control is, for its adaptation to the aforementioned valve arrangement, provided with electric chucking circuitry, including a main relay which, when energized, shifts the main valve to its operative position, a differential-pressure switch having two compartments and being closed except on pressure equilibrium in these compartments, and a normally open manual chucking switch which on closure by the chuck operator closes the circuitry, with the circuitry being, on release of the manual switch after customary momentary closure, held closed while the differential-pressure switch is and remains closed, and the chucking control further includes two branches from the aforementioned main conduit, of which a first branch leads from the conduit between the fluid pressure supply source and the main valve to one of the compartments of the differential-pressure switch, and the second branch leads from the other compartment of this switch to the main conduit between the main and check valves, with this second conduit branch having a constriction, and the first conduit branch having an interposed check valve which is normally closed to trap the fluid in the associated compartment of the differential-pressure switch so that the fluid therein is kept at the supply pressure. Thus, with the fluid in this latter compartment being normally at the supply pressure, and the chuck-closing cylinder end and, hence, also the other compartment of the differential-pressure switch being by appropriate action of an unchucking control vented when the chuck is open, the differential-pressure switch is closed when the operator starts a chucking operation on momentarily closing the chucking switch, resulting in admission of fluid under pressure from the supply source to the chuck-closing cylinder end and simultaneous admission of the same fluid to the other compartment of the differential-pressure switch through the second conduit branch with its constriction. This constriction is made so small that the pressure of the fluid admitted into the associated compartment of the differential-pressure switch reaches supply pressure only after the operating fluid in the chuck-closing cylinder end has shifted the piston to its chuck-closing position and also subjects the same in the latter position to the full supply pressure of the fluid, so that only after the work is safely gripped by the chuck jaws with the full contemplated force will there be reached pressure equilibrium in the compartments of the differential-pressure switch to open the latter and thereby permit return of the main valve to its inoperative position and thereby end the fluid pressure subjection of the manual drive start control for its functional response to the operator's manipulation to start the chuck drive.

A further object of the present invention is to provide the manual drive start control in a chuck installation of this type in the form of an electric drive start circuit having a normally-open manual start switch and a safety switch in series therewith, of which the safety switch is associated with a plunger in a cylinder chamber which through a passage is in communication with the main valve and the check valve associated with the chuck-closing cylinder end, with this plunger being spring-urged normally to close the safety switch, and the latter being opened when the plunger is subjected to fluid under pressure in the cylinder chamber. Thus, closure of the start switch will fail to close the drive start circuit while a chucking operation is in process during which the plunger is subjected to fluid under pressure in the cylinder chamber and, hence, holds the safety switch open. However, when the main valve is returned to its inoperative position to conclude the chucking operation, with ensuing venting of the cylinder chamber, the plunger will under the urgency of its spring close the safety switch and thereby condition the drive start circuit for closure whenever the start switch is closed.

It is another object of the present invention to provide in a chuck installation of this type a valve arrangement with manual chucking and unchucking controls and a drive start control which lend themselves to operation of the chuck with either end of the cylinder in the swivel coupling being selectively the chuck-closing cylinder end, and without ever giving rise to the aforementioned intolerable condition in chuck operation.

Further objects and advantages will appear to those skilled in the art from the following, considered in conjunction with the accompanying drawing.

In the accompanying drawing:

FIG. 1 illustrates in diagrammatic manner a chuck installation embodying the invention.

Referring to the drawing, there is shown in diagrammatic fashion a swivel coupling 10 having the usual fixed and operationally turning companion members 12 and 14, of which the member 14 customarily turns with a rotary chuck (not shown), and is provided with a cylinder 16 having therein a piston 18 which divides the cylinder into opposite ends 20 and 22. The piston 18 has the usual rod 24 which through a customary drawbar is connected with a jaw actuator of the associated chuck (neither shown). Let it be assumed in this example that the associated chuck will be closed on movement of the piston 18 from the full-line chuck-opening position into the dotted-line chuck-closing position, with the piston 18 being thus shifted into chuck-closing position by operating fluid under pressure admitted to the cylinder end 20 which thus becomes the "chuck-closing" cylinder end. To this end, operating fluid is passed from any suitable fluid pressure supply source 26 through a main conduit 28 to a port 30 in the fixed coupling member 12 and thence through a passage 32 which in the coupling leads from the port 30 to the chuck-closing cylinder end 20. Interposed in the main conduit 28 is a main valve 34 which divides this conduit into sections 36 and 38, with the main valve being normally spring-urged into the disclosed inoperative position in which to intercept communication between the conduit sections 36 and 38 and vent the conduit section 36 at 40, and being shiftable into an operative position in which to provide communication between the conduit sections 36 and 38 for admission of operating fluid under pressure to the chuck-closing cylinder end 20.

There is also provided a usual power drive D for the associated chuck exemplified in this instance by an electric motor in a circuit across an exemplary high-voltage power line PL, with this circuit including a normally-open drive switch 42 which on energization of an associated relay 54 is closed to close the circuit. Further provided is a manual drive start control 44 which is manipulatable to start the power drive, with this drive start control being in this instance a drive start circuit across a low-voltage control power line CL, and including a manual start switch 46, a "safety" switch 48 in a lead 50 across the power line CL, and a lead 52 in parallel with part of the lead 50 and having the interposed drive relay 54. The start switch 46 is in this instance normally open and will on closure close the drive start circuit when the safety switch 48 is closed. There is also provided a drive holding circuit to maintain the drive relay 54 energized when the drive start circuit is opened after preferred momentary closure of the start switch 46, with the drive holding circuit including the safety switch 48, a normally-open holding switch 56 in parallel with the drive start switch 46, and a relay 58 in the lead 52, with this relay 58, when energized, closing the holding switch 56. Thus, on momentary closure of the drive start circuit at the start switch 46, the drive holding circuit will be closed from one side of the control power line CL via the safety switch 48, the holding switch 56 which is then closed by the energized relay 58, relays 58 and 54 in the lead 52, and the lead 50 to the other side of the line CL, with this drive holding circuit remaining closed and, hence, the chuck power drive being operative, while the safety switch 48 remains closed and until a drive stop switch 60 is opened. This drive stop switch is a normally-closed manual switch in both, the drive start and holding circuits, wherefore on opening this stop switch 60 the chuck power drive comes to a stop.

To grip work by closing the associated chuck, the main valve 34 is shifted to its operative position in a manner explained hereinafter, thereby to admit operating fluid from the fluid pressure supply source 26 to the chuck-closing cylinder end 20 via the main conduit 28 and the passage 32 in the swivel coupling 10. With the main conduit 28 and the passage 32 being in any event of more or less restricted cross-section, it stands to reason that operating fluid from the supply source, be it liquid or air, will require some time interval, more or less short but inevitable, to fill the chuck-closing cylinder end 20 of usually considerable volume and force the piston 18 to its dotted-line chuck-closing position as well as subject the piston in the latter position to the full supply pressure of the fluid, and it is only at the end of this time interval, i.e., when the piston in its chuck-closing position is subjected to the full pressure of the supply fluid, that the work is gripped by the jaws of the associated chuck with the contemplated safe force. Accordingly, if the chuck operator would start the power drive of the chuck before the end of this time interval, appropriately called "safe chucking" time interval, this might well give rise to the aforementioned intolerable condition in chuck operation. Therefore, in order completely to avoid such an intolerable condition, there is featured a safety chucking control which during a work chucking cycle locks the drive start circuit in open condition and, hence, prevents the power drive of the chuck, at least until the end of the safe chucking time interval.

The safety chucking control includes as a key component instrument means, including a plunger, associated with the manual drive start control and normally conditioning this control for operation on manipulation of the latter, but acting on subjection of the plunger to fluid pressure to render the control inoperative. With this manual drive start control being in this instance the described drive start circuit with the manual start switch 46, the instrument means is the safety switch 48 in both, the drive start and holding circuits, with this safety switch 48 being normally spring-urged into closed position, and being associated with a plunger 62 in a cylinder chamber 64 which through a conduit connection to-be-described is in communication with the section 36 of the main conduit 28. Accordingly, on shifting the main valve 34 to its operative position and retaining it in that position at least during the safe chucking interval, the plunger 62 is subjected to fluid pressure and holds the safety switch 48 in open position to prevent any possible start of the power drive, as will be readily understood. However, when the main valve 34 is returned to its illustrated inoperative position and the conduit section 36 vented through the main valve 34 in consequence, the cylinder chamber 64 will also be vented and the safety switch 48 spring-returned to its closed position to permit the start of the power drive on momentary closure of the start switch 46. To avoid venting of the chuck-closing cylinder end 20 when the main valve 34 is returned to its inoperative position with ensuing venting of the conduit section 36, there is interposed, either in the conduit section 36 or in the fluid passage 32 in the swivel coupling 10, a check valve 66 which is normally closed to trap the operating fluid in the chuck-closing cylinder end 20, but will open to admit fluid under pressure into the latter for a work chucking operation. The check valve 66 is in this instance interposed in the fluid passage 32 in the fixed coupling member 12. In order that the safety switch 48 will function properly, i.e., close when the main valve 34 is returned to its inoperative position, the aforementioned conduit connection between the cylinder chamber 64 and the conduit section 36 must lead into the latter between the main and check valves 34 and 66 in any event, as will be readily understood.

The main valve is in this instance shifted into its operative position by a main relay 68 which must be energized at least for the duration of the safe chucking interval in order to hold the main valve in its operative position for that length of time. While initial energization of the main relay 68 is preferably under the control of the chuck operator, it is also preferred to bring continuing energization of this main relay at least for the duration of the safe chucking interval under automatic control. The circuit of the main relay 68 includes a normally-open control switch 70 which, when closed, closes this relay circuit, with the latter providing a lead 72 from one side of the control power line CL to the switch 70, and a continuing lead 74 to the other side of the line CL, with the main relay 68 being interposed in the lead 74. The control switch 70 is closed on energization of an associated control relay 76. To bring initial energization of the control relay 76 and, hence, of the main relay 68, under the chuck operator's control, there is provided a starting circuit for the control relay 76, and there is also provided a holding circuit for the same relay, with this holding circuit, when once closed by the starting circuit, remaining closed for a preset time period which is at least equal to the safe chucking time interval. The starting circuit of the control relay 76 includes the lead 72 from one side of the control power line CL, a lead 78, a normally-open manual "chucking" switch 80, and a lead 82 to the other side of the line CL, with the control relay being interposed in the lead 82. The holding circuit of the control relay 76 includes the lead 72 from one side of the control power line CL, a lead 84 with an interposed differential-pressure switch 86, a normally-open holding switch 88, a lead 90, and the lead 82 to the other side of the line CL, with the holding switch 88 being closed by the associated control relay when energized. The differential-pressure switch 86 may be of any suitable type, being shown in this instance with two compartments 92 and 94 and contacts 96 and 98 which are closed except on substantial pressure equilibrium in both compartments 92 and 94. The two compartments 92 and 94 are in this instance separated by a flexible diaphragm 100 which carries the contact 96, while the other contact 98 is fixed. The starting circuit of the control relay 76 is thus closed on manual, and preferably momentary, closure of the chucking switch 80, resulting in initial closure of the circuit of the main relay 68 and ensuing shift of the main valve 34 to its operative position. The moment the starting circuit of the control relay 76 is closed, the holding circuit of the latter will close and will remain closed until the normally-closed differential-pressure switch 86 will open. The differential-pressure switch 86 is another key element of the safety chucking control, in that this switch is arranged to open, and hence open the holding circuit of the control relay 76 and thereby also the circuit of the main relay 68, after a preset time period from initial closure of these circuits, with this preset time period being at least equal to the safe chucking interval. To this end, the compartments 92 and 94 of the switch 86 are through conduits 102 and 104 in communication with the sections 36 and 38, respectively, of the main conduit 28, with the conduit 102 being in communication with the conduit section 36 between the main valve 34 and the check valve 66 if the latter were interposed in the conduit section 36 rather than in the fluid passage 32 in the fixed coupling member 12 as shown. The conduit 104 holds fluid under the supply pressure the same as the section 38 of the main conduit 28, wherefore the compartment 94 of the differential-pressure switch 86 normally holds fluid at the supply pressure. With the associated chuck being in this instance open and the piston 18 being, therefore, in its full-line chuck-opening position in which the chuck-closing cylinder end 20 is vented, as later described, through the main valve 34, the conduit 102 is also vented, wherefore the fluid at the supply pressure in the compartment 94 of the differential-pressure switch 86 holds the diaphragm 100 at maximum flexure at which the switch is closed at the contacts 96 and 98. Provided in the conduit 102 is a constriction 106 which forms another important part of the safety chucking control. Thus, on initiating a chucking cycle on momentary closure of the chucking switch 80, and ensuing shift of the main valve 34 to its operative position for admission of fluid from the pressure supply source 26 to the chuck-closing end 20, fluid from the same source will also pass through the conduit 102, with the constriction 106 in this conduit being made so narrow that it will require a preset time interval until the pressure of the fluid in the compartment 92 of the differential-pressure switch reaches full supply pressure, with this preset time interval being at least equal to, and preferably slightly longer than, the safe chucking interval. The fluid pressures in the compartments 92 and 94 thus reach substantial equilibrium at the end of the preset time interval at which the diaphragm 100 will be substantially flat and the contacts 96 and 98 disengaged, wherefore the differential-pressure switch will at the end of the preset time interval be opened and thereby open the holding circuit of the control relay 76, with ensuing opening of the circuit of the main relay 68 and spring-return of the main valve 34 to its illustrated inoperative position. Once the main valve 34 is returned to its inoperative position, the conduit section 36, and with it the cylinder chamber 64 of the safety switch 48, will be vented through the main valve 34, resulting in spring-closure of the safety switch 48 and thereby conditioning the drive start circuit for closure on manual closure of the start switch 46.

The aforementioned conduit connection between the cylinder chamber 64 of the safety switch 48 and the section 36 of the main conduit 28 is by way of a conduit 108 and the conduit 102 into which the conduit 108 leads. The constriction 106 in the conduit 102 is preferably formed by a valve 110 which is interposed in the conduit 102 and adjustable to vary the size of the constriction 106. Also, there is preferably interposed in the conduit 104 a check valve 112 which is normally closed to trap fluid at the supply pressure in the compartment 94 of the differential-pressure switch 86. Also, the fluid pressure supply source 26 is preferably provided with an output pressure regulator 114 which is adjustable for any output pressure of the fluid from the source within a certain range to thereby obtain different desired gripping forces by the chuck jaws on different work. However, since it is essential for proper functioning of the safety chucking control that the pressure of fluid in the compartment 94 of the differential-pressure switch 86 be equal to the regulated fluid output pressure from the source 26, the conduit 104 between the compartment 94 and the check valve 112 may be vented at 116 on manually opening a normally-closed relief valve 118. Thus, it will be necessary to open this valve 118 everytime the pressure regulator 114 is set for an output pressure lower than the pressure for which it was previously set.

In the present example, the starting and holding circuits of the control relay 76 and the circuit of the main relay 68, called the chucking circuits for brevity, and also the drive start and holding circuits, are across the same control power line CL, wherefore it would be possible to stop the power drive of the associated chuck in the middle of a machining operation on chucked work, by causing opening of the safety switch 48 on accidental closure of the chucking switch 80 and ensuing operation of the main valve 34 through a chucking cycle. In order to avoid this, there is interposed in the lead 72, which is common to the chucking circuits, a suitable switch 120 which is arranged to be closed when the power drive is inoperative, and to be open when the power drive is operative, so that all chucking circuits will be open when the power drive is operative. The switch 120 is in this instance a centrifugal switch which is drivingly connected with the power drive as represented by the dotted line 122.

The description so far is silent as to how the piston 18 may be shifted to its full-line chuck-opening position. It is, of course, feasible to have recourse to a spring (not shown) to shift the piston 18 to its chuck-opening position, but this would also require venting of the chuck-closing cylinder end by opening the check valve 66 in any suitable manner. It is, however, much preferred to admit operating fluid from the fluid pressure supply source 26 to the chuck-opening cylinder end 22 in order to shift the piston to its chuck-opening position. To this end, there is provided another main conduit 130 leading from the fluid pressure supply source 26 to another port 132 in the fixed coupling member 12 and a continuing fluid passage 134 in the coupling 10 from the port 132 to the chuck-opening cylinder end 22. Interposed in the main conduit 130 is another main valve 136 which divides the main conduit into sections 138 and 140, with the main valve 136 being normally urged into the illustrated inoperative position in which to intercept communication between the conduit sections 138, 140 and vent the conduit section 138 as at 142, and being shiftable into an operative position in which to provide communication between the conduit sections 138 and 140. Thus, on shifting the main valve 136 to its operative position in a manner to be described, operating fluid will pass from the supply source 26 to the chuck-opening cylinder end 22. However, in order that the admitted operating fluid in the chuck-opening cylinder end may shift the piston 18 to its chuck-opening position, the chuck-closing cylinder end 20 must be vented. To the latter end, there is associated with the check valve 66 a plunger 144 in a cylinder chamber 146 in the fixed coupling member 12, with this cylinder chamber 146 being through a passage 148 in communication with the fluid passage 134 in the fixed coupling member 12. Accordingly, on passing operating fluid under pressure into the chuck-opening cylinder end 22, the plunger 144 will be subjected to this operating fluid and open the check valve 66 to permit venting of the chuck-closing cylinder end 20 through the main valve 34 in its inoperative position.

The main valve 136 is shifted to its operative position by another main relay 150 in an unchucking circuit which includes the lead 72 from one side of the control power line CL, a lead 152 with an interposed normally-open unchucking switch 154, a lead 156, main relay 150, and a lead 158 to the other side of the line CL, with this circuit being closed on closure of the unchucking switch 154 for shifting the main valve 136 to its operative position. The normally-open chucking switch 154 is in this instance ganged with a normally-closed manual switch 160 in both, the starting and holding circuits of the control relay 76, with the unchucking switch 154 being closable only on opening the manual switch 160, thereby assuring that the main valve 34 is in its inoperative position to permit venting of the chuck-closing cylinder end when the operator closes the unchucking switch 154 through intermediation of the manual switch 160.

Provisions are also made to adapt either end 20 or 22 of the cylinder 16 in the turning coupling member 14 for chuck closing and the other cylinder end for chuck opening, with the safety chucking control performing its function in either case. To this end, and for adapting either main valve 34 or 136 for chucking work, there are provided separate chucking circuits for the respective main relays 68 and 150. The chucking circuit of the main relay 68 has already been described, and a rump part of this circuit extending from one side of the control power line CL via the lead 72 to and including the control switch 70, is also part of the chucking circuit of the other main relay 150, with this rump part of the circuits being selectively connectible with the remaining circuit branches for the respective main relays 68 and 150 by a switching device 170 which is manually shiftable into either of two positions. The switching device 170 provides a plurality of ganged switches, including switches 172 and 174, of which switch 172 is in the remaining circuit branch for the main relay 68 by being interposed in the lead 74 in series with the main relay 68, while the other switch 174 is in the remaining circuit branch for the other main relay 150, which includes lead 74, a lead 176 with the interposed switch 174, lead 156, main relay 150 and lead 158 to the other side of the line CL. The switching device 170 is shown in one of its positions in which switch 172 is closed and the companion switch 174 is open, meaning that the switching device is then set for operation of the main valve 34 to chuck work via the cylinder end 20 as the chuck-closing cylinder end. If it is desired to chuck work via the cylinder end 22 as the chuck-closing cylinder end, it is merely necessary to shift the switching device 170 to its other position in which switch 172 is open and the companion switch 174 is closed, as will be readily understood.

The safety chucking control described so far is fully operative when the cylinder end 20 is selected as the chuck-closing cylinder end. In order to render the safety chucking control equally operative when the other cylinder end 22 is selected as the chuck-closing cylinder end, the section 138 of the main conduit 130 must be in communication with the compartment 92 of the differential-pressure switch 86 via the constriction 106 in the conduit 102, and at the same time the section 36 of the other main conduit 28 must be disconnected from the fluid passage from the conduit section 138 to the compartment 92 of the differential-pressure switch 86 in order to condition the conduit section 36 for venting via the main valve 34. To this end, the conduit 102 is provided in two separate conduit branches 178 and 180, and there is further provided a shuttle valve 182 with a valve chamber 184 and a valve member 186 therein, with the conduit branch 178 having the constriction 106 and leading from the compartment 92 of the differential-pressure switch 86 into the valve chamber 184, and the other conduit branch 180 leading from one end of the valve chamber 184 to the section 36 of the main conduit 28. The other end of the valve chamber 184 is in communication with the section 138 of the other main conduit 130 through a conduit branch 188. Thus, on selecting the cylinder end 22 as the chuck-closing cylinder end and starting a chucking cycle on closing the chucking switch 80, fluid under pressure passing through the main conduit 130 to the chuck-closing cylinder end 22 will also pass through the conduit branch 188, the shuttle valve 182 and the conduit branch 178 with the interposed constriction 106 to the compartment 92 of the differential-pressure switch 86, with this fluid also forcing the valve member 186 to close the one end of the valve chamber 184 of the shuttle valve which is in communication with the conduit branch 180 and, hence, with the section 36 of the main conduit 28.

For proper functioning of the safety chucking control when the cylinder 22 is selected as the chuck-closing cylinder end, it is also necessary to trap the operating fluid in this cylinder end when at the end of the preset time interval of the chucking cycle the main valve 136 is returned to its inoperative position to vent the section 138 of the main conduit 130. To this end, there is provided, in this example in the fluid passage 134 in the fixed coupling member 12, another check valve 190 which is normally closed to trap the operating fluid in the chuck-closing cylinder end 22 when the section 138 of the main conduit 130 is vented through the main valve 136.

While in the use of the cylinder end 22 as the chuck-closing cylinder end the shuttle valve 182 conditions the section 36 of the main conduit 28 for venting through the main valve 34 as explained, it is the check valve 66 associated with the then chuck-opening cylinder end 20 which is opened to permit venting of the latter when operating fluid is admitted to the chuck-closing cylinder end 22, with this operating fluid also reaching the cylinder chamber 146 via the passage and forcing the plunger 140 to open the check valve 66.

In order to permit venting of the cylinder end 22 via the associated check valve 190 when the other cylinder end 20 is used as the chuck-closing cylinder end, there is further provided a plunger 192 in a cylinder chamber 194 which through a passage 196 is in communication with the fluid passage 32 in the fixed coupling member 12. Thus, on admitting operating fluid into the selected chuck closing cylinder end 20, this fluid will, through the passage 196, also reach the cylinder chamber 194 and force the plunger 192 therein to open the check valve 190.

There has already been described an unchucking circuit for the main relay 150 of the main valve 136 to admit operating fluid to the chuck-opening end 22 of the cylinder when the other cylinder end 20 is used as the chuck-closing cylinder end. However, since the cylinder end 22 may alternatively be used as the chuck closing cylinder end, there must also be provided another unchucking circuit for the other main relay 68 associated with the main valve 34 to admit operating fluid to the then chuck-opening cylinder end 20. Both of these unchucking circuits have a common rump part providing lead 72 from one side of the control power line CL and lead 152 with the interposed unchucking switch 154, and the remainders of these unchucking circuits are circuit branches selectively connectible with the rump part of these circuits by further ganged switches 198 and 200 of the switching device 170. Thus, the switch 198 is in the circuit branch for the main relay 150, while the other switch 200 is in the circuit branch for the other main relay 68, with the circuit branch for the main relay 150 including the lead 156 with the interposed switch 198, main relay 150, and lead 158 to the other side of the control power line CL, and the circuit branch for the other main relay 68 including a lead 202 with the interposed switch 200, and lead 74 having the interposed main relay 68 and extending to the other side of the line CL. Thus, in the position of the switching device 170 as shown, in which the cylinder end 20 is the selected chuck-closing cylinder end, the switch 198 is closed to condition the unchucking circuit of the main relay 150 for closure when the unchucking switch 154 is closed. Conversely, when the switching device 170 is shifted to its other position in which the cylinder end 22 is the selected chuck-closing cylinder end, the switch 200 is closed to condition the unchucking circuit of the other main relay 68 for closure when the unchucking switch 154 is closed.

While in the present chuck installation there are provided vents 40 and 142 in the main valves 34 and 136 and a vent 116 in the relief valve 118, thereby being particularly suitable for pneumatic chuck operation, it is, of course, fully within the ambit of the invention to actuate the chuck hydraulically, in which case the vents 40, 142 and 116 would be in the preferred form of exhaust or return lines to a reservoir (neither shown), as will be readily understood.

What is claimed is:

1. Safe work grip mechanism for a rotary chuck having a power drive with a manual start control operative on manipulation to start the power drive, and companion fixed and rotary coupling members having a port in the fixed member, a cylinder in the rotary member with a piston defining in the cylinder a chuck-closing end and being shiftable into chuck-closing and chuck-opening positions, and a first passage from said port to said cylinder end, said mechanism comprising first means, including a first plunger, associated with said start control and normally conditioning said control for operation on manipulation of the latter, but acting on subjection of said plunger to fluid pressure to render said control inoperative; a first main conduit between said port and a fluid pressure supply source; a first main valve interposed in said conduit and dividing the latter into first and second sections, of which said first section leads to said port and forms together with said first passage a second passage from said main valve to said cylinder end, with said valve being normally urged into a first position in which to interrupt communication between said sections and vent said first section, and shiftable into a second position in which to provide communication between said sections; a first check valve in said second passage normally closed to trap fluid under pressure in said cylinder end; a differential-pressure switch having two compartments and being closed except on substantial pressure equilibrium in said compartments; second and third conduits, of which said second conduit connects one of said compartments with said second passage between said main and check valves, and said third conduit connects the other compartment with said second conduit section; a constriction in said second conduit to delay fluid pressure rise to supply pressure in said one compartment at least until on admission of fluid under pressure into said cylinder end said piston has been shifted to its chuck-closing position and in the latter position is also subjected to the full supply pressure of the fluid, with said plunger being for fluid pressure subjection in communication with said second passage between said main and check valves; a second check valve in said third conduit normally closed to trap fluid under pressure in said other compartment at the supply pressure; a main relay adapted, when energized, to shift said main valve into said second position; and control circuitry for said main relay, including said main relay, a manual start switch and said differential-pressure switch, with said circuitry being closed on closure of said start switch when said differential-pressure switch is closed, and being opened on opening of said differential-pressure switch when said start switch is open.

2. Safe work grip mechanism for a rotary chuck as in claim 1, in which said drive start control is a drive start circuit including another manual switch, said means includes a normally-closed safety switch in said drive circuit in series with said other manual switch, with said safety switch being opened by said plunger when subjected to fluid pressure, and said drive start circuit being open when either of said safety and other switches is open, and being closed when both of said safety and other switches are closed, and said control circuitry is in parallel with said drive start circuit and includes a control switch arranged to be closed when the power drive is inoperative and to be opened when the power drive is operative, with said control circuitry being open when said control switch is open.

3. Safe work grip mechanism for a rotary chuck as in claim 2, in which said control switch is a centrifugal switch operatively associated with said power drive.

4. Safe work grip mechanism for a rotary chuck as in claim 1, in which said fluid pressure supply source includes a pressure regulator settable for different output pressures of the fluid, and there is further provided a vent in said third conduit between said other compartment and second check valve, and a plunger normally closing said vent and manipulatable to open said vent.

5. Safe work grip mechanism for a rotary chuck as in claim 1, in which said constriction is provided by a valve interposed in said second conduit and adjustable to vary the size of said constriction.

6. Safe work grip mechanism for a rotary chuck as in claim 1, in which said piston defines in said cylinder another end for shifting said piston to said chuck-opening position on admission of fluid under pressure into said other cylinder end, and said coupling members have a second port in said fixed member and a third passage from said second port to said other cylinder end, and there is further provided another main conduit from said fluid pressure supply source to said second port, a second main valve interposed in said other main conduit and dividing the latter into third and fourth sections of which said third section leads to said second port, with said second main valve being normally urged into a first position in which to interrupt communication between said third and fourth conduit sections and vent said third conduit section, and shiftable into a second position in which to provide communication between said third and fourth conduit sections, a second plunger associated with said first check valve and operative on subjection to fluid pressure to open the latter, a fluid passage from said third conduit section to said second plunger for fluid pressure subjection of the latter, and unchucking means manually operable for shifting said second main valve into said second position.

7. Safe work grip mechanism for a rotary chuck as in claim 6, in which said drive start control is a drive start circuit, including another manual switch closable to close the circuit, said first means includes a normally-closed safety switch in said drive start circuit in series with said other switch, with said safety switch being opened by said first plunger when subjected to fluid pressure, said control circuitry is in parallel with said drive start circuit and includes a control switch arranged to be closed and opened when the power drive is inoperative and operative, respectively, with said control circuitry being open when said control switch is open, and said unchucking means is an unchucking circuit including a manual unchucking switch, said control switch, and a second main relay adapted, when energized, to shift said second main valve into said second position, with said unchucking circuit being closed on closure of said unchucking and control switches, and being open when either said unchucking switch or said control switch is open.

8. Safe work grip mechanism for a rotary chuck as in claim 7, in which said control circuitry includes a further normally-closed switch which, when opened, opens said control circuitry, with said further switch being ganged with said unchucking switch so that the latter is open when said further switch is closed, and is closed when said further switch is open.

9. Safe work grip mechanism for a rotary chuck having a power drive with a manual start control operative on manipulation to start the power drive, and companion fixed and rotary coupling members having first and second ports in the fixed member, a cylinder in the rotary member with a piston defining in the cylinder opposite first and second ends and being shiftable into two operating positions on admission of fluid under pressure into the respective cylinder ends, and first and second passages from said first and second ports to said first and second cylinder ends, respectively, said mechanism comprising first means, including a first plunger, associated with said drive start control and normally conditioning said control for operation on manipulation of the latter, but acting on subjection of said plunger to fluid pressure to render said control inoperative; first and second conduits from a fluid pressure supply source to said first and second ports; respectively; first and second main valves interposed in said first and second conduits, respectively, and dividing said first and second conduits into first and second sections and into third and fourth sections, respectively, of which said first and third sections lead to said first and second ports, respectively, and together with said first and second passages define third and fourth passages leading from said first and second main valves to said first and second cylinder ends, respectively, with said first and second main valves being normally urged into a first position in which to interrupt communication between said first and second conduit sections and between said third and fourth conduit sections, respectively, and vent said first and third conduit sections, respectively, and shiftable into a second position in which to provide communication between said first and second conduit sections and between said third and fourth conduit sections, respectively; first and second check valves in said third and fourth passages, respectively, normally closed to trap fluid under pressure in the respective first and second cylinder ends; a differential-pressure switch having two compartments and being closed except on substantial pressure equilibrium in said compartments; a shuttle valve having a chamber with opposite ends in communication with said third and fourth passages, respectively, between said first main and check valves and between said second main and check valves, and a movable valve member in said chamber acting on subjection to fluid under pressure admitted through either chamber end to close the other chamber end; third and fourth conduits, of which said third conduit leads from one of said compartments to said valve chamber, and said fourth conduit leads from said fluid pressure supply source to the other of said compartments; second and third plungers associated with said first and second check valves, respectively, and each operative on subjection to fluid pressure to open the associated valve, with said second and third plungers being exposed to fluid under pressure in said fourth and third passages, respectively; a constriction in said third conduit to delay fluid pressure rise to supply pressure in said one compartment at least until on admission of fluid under pressure to either cylinder end the piston has been shifted to the corresponding operating position and is also subjected to the full supply pressure of the fluid; a third check valve in said fourth conduit normally closed to trap fluid under pressure in said other compartment at the supply pressure; first and second main relays adapted, when energized, to shift said first and second main valves, respectively, into said second position; a first circuit branch including a normally-open control switch, second and third circuit branches including said first and second main relays, respectively, switch means manipulatable into first and second positions in which to connect said first circuit branch with said second and third circuit branches, respectively, with said first circuit branch and the therewith connected second or third circuit branch forming a chucking circuit which is closed on closure of said control switch; a control relay adapted, when energized, to close said control switch, and control circuitry for said control relay, including said control relay, a manual start switch and said differential-pressure switch, with said circuit being closed on closure of said start switch when said differential-pressure switch is closed, and being opened on opening of said differential-pressure switch when said start switch is open.

10. Safe work grip mechanism for a rotary chuck as in claim 9, in which said control circuitry provides a starting circuit for said control relay, including said control relay and said manual start switch closable to close said starting circuit, and a holding circuit for said control relay, including said control relay, said differential-pressure switch and another normally-open switch closed by said control relay when energized, with said holding circuit being closed on closure of said other and differential-pressure switches, and being opened on opening of said differential-pressure switch; and there are further provided a fourth circuit branch including a normally-open unchucking switch, and fifth and sixth circuit branches, including said first and second main relays, respectively, with said switch means in said first and second positions also connecting said fourth circuit branch with said sixth and fifth circuit branches, respectively, and said fourth and therewith connected fifth or sixth circuit branch forming an unchucking circuit closed on closure of said unchucking switch.

11. Safe work grip mechanism for a rotary chuck as in claim 10, in which said starting and holding circuits also include a further normally-closed switch which, when opened, opens said starting and holding circuits, and said unchucking switch is ganged with said further switch so that the latter is closed and opened when said unchucking switch is open and closed, respectively.

12. Safe work grip mechanism for a rotary chuck as in claim 9, in which said fluid pressure supply source includes a pressure regulator settable for different output pressures of the fluid, and there is further provided in said fourth conduit between said other compartment and third check valve a vent, and a spring-urged plunger normally closing said vent and manipulatable to open said vent.

13. Safe work grip mechanism for a rotary chuck as in claim 9, in which said constriction is provided by a valve interposed in said third conduit and adjustable to vary the size of the constriction.

14. Safe work grip mechanism for a rotary chuck as in claim 10, in which said drive start control is a drive start circuit, including another manual switch, said first means includes a normally-closed safety switch in said drive start circuit in series with said other switch, with said safety switch being opened by said first plunger when subjected to fluid pressure, and said drive start circuit being open when either of said safety and other switches is open, and being closed when both of the latter switches are closed, and said chucking, starting, holding and unchucking circuits are in parallel with said drive start circuit and include a second control switch arranged to be closed an opened when the power drive is inoperative and operative, respectively, with said chucking, starting, holding and unchucking circuits being open when said second control switch is open.

* * * * *